United States Patent
Liao et al.

(10) Patent No.: US 9,894,322 B1
(45) Date of Patent: Feb. 13, 2018

(54) VIDEO CONFERENCE SYSTEM, SERVER AND TERMINAL EQUIPMENT

(71) Applicant: VIA TECHNOLOGIES, INC., New Taipei (TW)

(72) Inventors: Wenwei Liao, Shanghai (CN); Jie Fang, Shanghai (CN); Steve Shu Liu, Shanghai (CN)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 15/480,687

(22) Filed: Apr. 6, 2017

(30) Foreign Application Priority Data

Mar. 8, 2017 (CN) .......................... 2017 1 0135715

(51) Int. Cl.
  *H04N 7/15* (2006.01)
  *H04L 29/06* (2006.01)
  *H04L 29/08* (2006.01)
  *H04L 12/26* (2006.01)

(52) U.S. Cl.
  CPC ............. *H04N 7/152* (2013.01); *H04L 43/08* (2013.01); *H04L 65/403* (2013.01); *H04L 65/608* (2013.01); *H04L 67/10* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,128,649 A * | 10/2000 | Smith | .................... | H04N 7/152 348/14.03 |
| 2005/0231588 A1* | 10/2005 | Yang | ................... | H04L 12/1813 348/14.08 |
| 2015/0156231 A1* | 6/2015 | Noisette | .............. | H04L 12/1818 709/204 |

* cited by examiner

*Primary Examiner* — Joseph J Nguyen
(74) *Attorney, Agent, or Firm* — McClure, Qualey & Rodack, LLP

(57) ABSTRACT

The present invention provides a video conference system. The video conference system includes a plurality of terminal equipment and a server. Each of the terminal equipment estimates and transmits real-time bandwidth and conference requirements to the server. A multipoint control unit of the server includes a multipoint controller and a multipoint processor. The multipoint controller determines, according to the real-time bandwidth and the conference requirements, a transfer rule and an allocation scheme corresponding to each of the terminal equipment. The multipoint processor receives the transfer rule and voice data stream or video data stream from the terminal equipment. The server transmits each of the allocation schemes to the corresponding terminal equipment. When any of the terminal equipment transmits new real-time bandwidth or new conference requirements to the server, the multipoint controller determines the transfer rule and the allocation schemes once again.

14 Claims, 6 Drawing Sheets

VIDEO CONFERENCE SYSTEM, SERVER AND TERMINAL EQUIPMENT

CROSS REFERENCE TO RELATED APPLICATIONS

This Application claims priority of China Patent Application No. 201710135715.1 filed on Mar. 8, 2017, the entirety of which is incorporated by reference herein.

BACKGROUND OF THE INVENTION

Field of the Invention

The invention generally relates to a multipoint processor of a video conference system, and more particularly, to adjusting a transfer rule of the multipoint processor according to the real-time bandwidth.

Description of the Related Art

During a video conference, the multipoint control unit (MCU) of the server is the key equipment for handling a video conference. FIG. 1 is a block diagram of a conventional video conference system 1. As shown in FIG. 1, the video conference system 1 includes a server 10 and several terminal equipment T1~Tn. The MCU 100 of the server 10 includes a multipoint controller (MC) 101 and a multipoint processor (MP) 102. The MC 101 receives a conference control command, and sets coding parameters for the MP 102. The MP 102 includes a decoding circuit and a coding circuit. The MP 102 executes coding and decoding on the media data (video and audio) from different terminal equipment according to the coding parameters provided by the MC 101. Therefore, there is very high demand for hardware of the MP 102. In addition, the operations of coding and decoding cause loss, which increases the time delay and reduces the quality. Therefore, another video conference system and its corresponding method of adaptively adjusting bandwidth are provided by the present invention.

BRIEF SUMMARY OF THE INVENTION

In one aspect of the invention, a video conference system is provided. The video conference system includes a plurality of terminal equipment and a server. Each of the terminal equipment evaluates a real-time bandwidth and transmits the real-time bandwidth and a conference requirement. The server connects to each of the terminal equipment wirelessly or with wires in order to receive the real-time bandwidth and the conference requirement corresponding to each of the terminal equipment. The multipoint control unit of the server includes a multipoint controller and a multipoint processor. The multipoint controller receives a conference control command to execute a multi-subject conference. The multipoint controller determines a transfer rule and an allocation scheme corresponding to each of the terminal equipment based on the real-time bandwidth and the conference requirement corresponding to each of the terminal equipment. The multipoint processor is connected to the multipoint controller, receives the transfer rule and an audio data stream or a video data stream from each of the terminal equipment. The multipoint processor transfers the audio data stream or the video data stream which is needed by each of the terminal equipment based on the transfer rule. The server transmits the allocation scheme to the corresponding terminal equipment. When any one of the terminal equipment transmits a new real-time bandwidth or a new conference requirement, the multipoint controller re-determines the transfer rule and the allocation rule.

In another aspect of the invention, a server is provided. The server connects to each of the terminal equipment wirelessly or with wires in order to receive the real-time bandwidth and the conference requirement corresponding to each of the terminal equipment. The multipoint control unit of the server includes a multipoint controller and a multipoint processor. The multipoint controller receives a conference control command to execute a multi-subject conference. The multipoint controller determines a transfer rule and an allocation scheme corresponding to each of the terminal equipment based on the real-time bandwidth and the conference requirement corresponding to each of the terminal equipment. The multipoint processor is connected to the multipoint controller, receives the transfer rule and an audio data stream or a video data stream from each of the terminal equipment. The multipoint processor transfers the audio data stream or the video data stream which is needed by each of the terminal equipment based on the transfer rule. The server transmits the allocation scheme to the corresponding terminal equipment. When any one of the terminal equipment transmits a new real-time bandwidth or a new conference requirement, the multipoint controller re-determines the transfer rule and the allocation rule.

In another aspect of the invention, terminal equipment is provided. The terminal equipment is utilized to attend a multi-subject video conference executed by a server and provide an estimated bandwidth to the server. The terminal equipment is arranged to evaluate whether the hardware capacity and data transmission status of the terminal equipment meets a requirement or not. When any one of the hardware capacity and the data transmission status does not meet the requirements and the terminal equipment does not execute a bandwidth rising test, the terminal equipment reduces the bandwidth and re-evaluates the bandwidth. When the hardware capacity and the data transmission status meet the requirements, the terminal equipment determines whether a bandwidth incremental test is being executed or not.

Other aspects and features of the present invention will become apparent to those with ordinary skill in the art upon review of the following descriptions of specific embodiments of the video conference system, server or terminal equipment.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
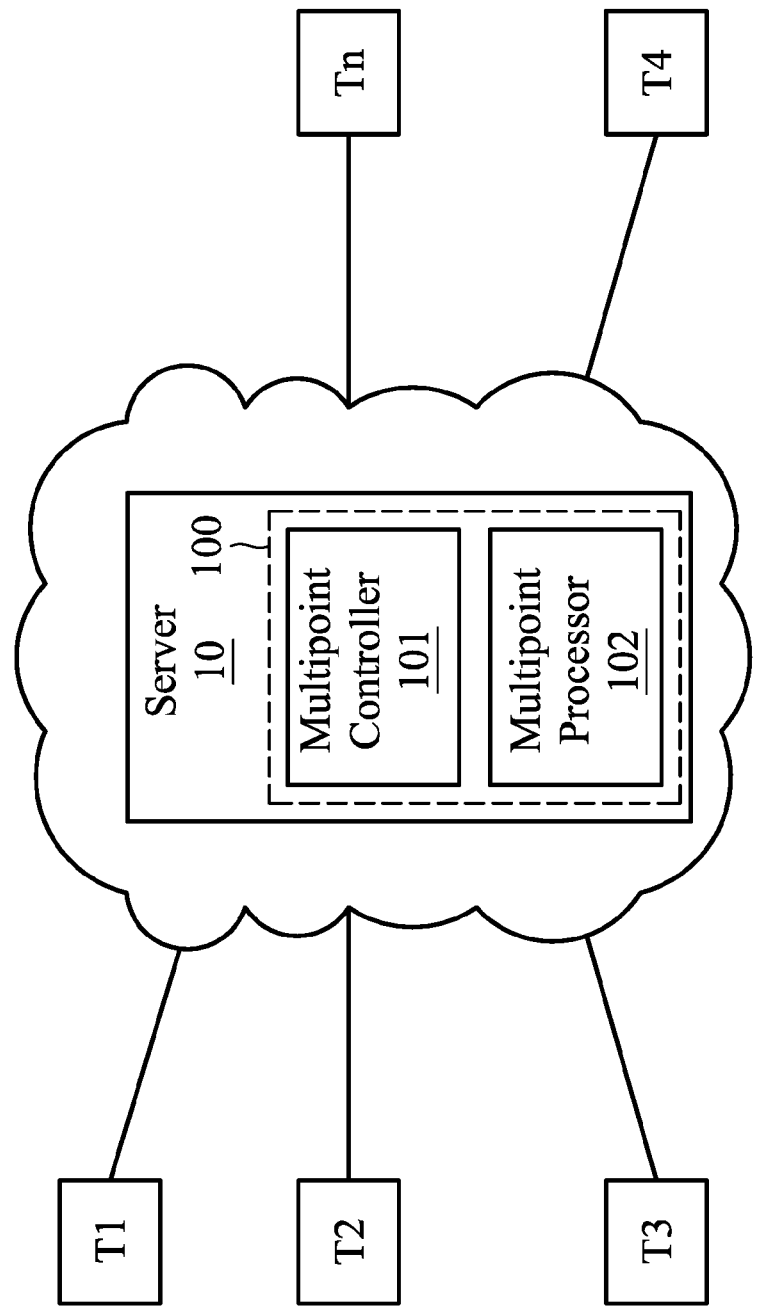
FIG. 1 is a block diagram of a conventional video conference system 1.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 2:
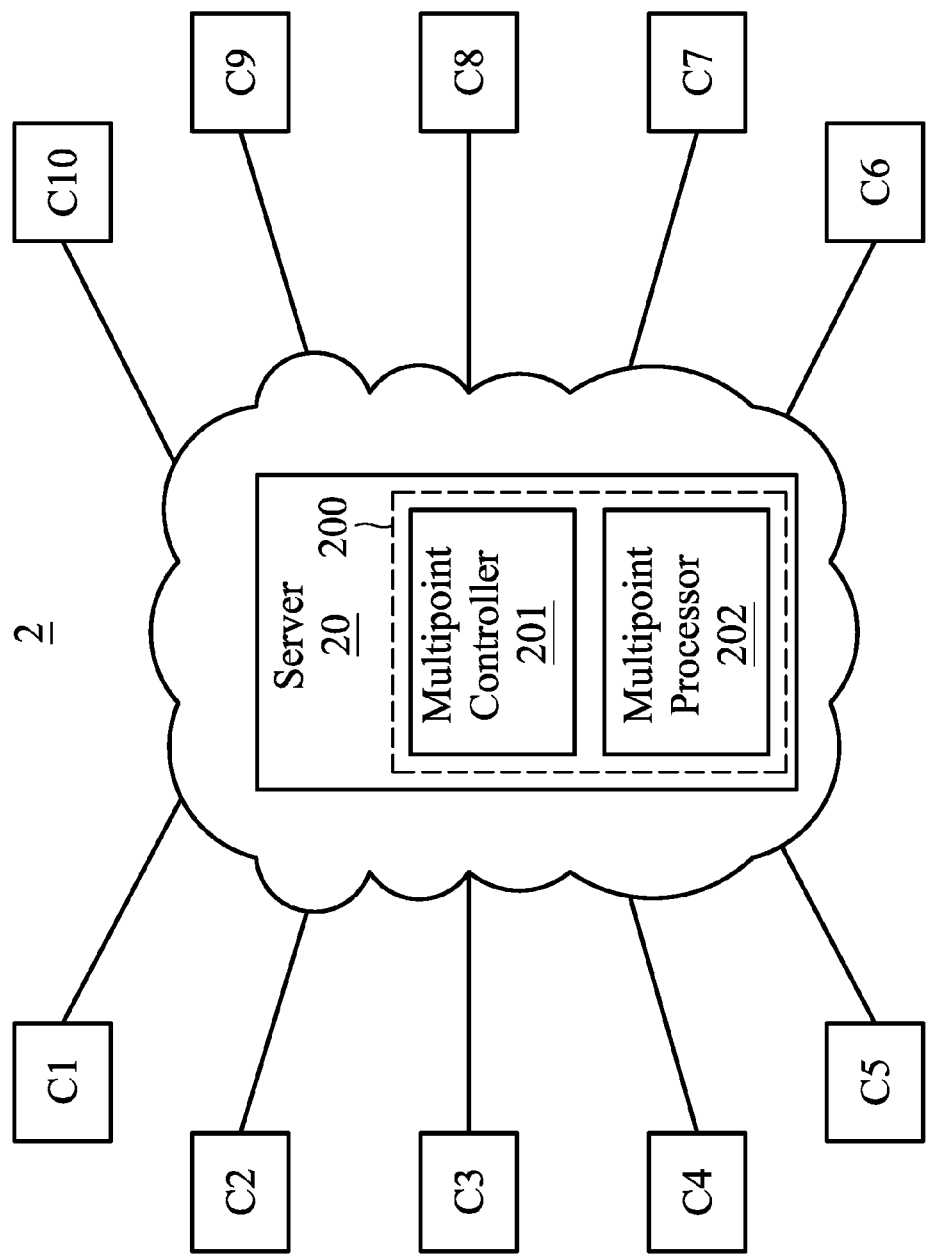
FIG. 2 is a block diagram of a video conference system 2, in accordance with one embodiment of the present invention.

FIG. 2 is a block diagram of a video conference system 2, in accordance with one embodiment of the present invention. In the embodiment of the present invention, the video conference system 2 includes a server 20 and a plurality of terminal equipment C1~C10. The server 20 includes a multipoint control unit (MCU) 200. As shown in FIG. 2, the MCU 200 includes a multipoint controller (MC) 201 and a multipoint processor (MP) 202. The MC 201 connects the MP 202. The server 20 can be a cloud server. Each of the terminal equipment C1~C10 can be a mobile terminal (such as a laptop computer, a tablet computer, a handhold computer, a smart phone, a smart watch and so on), a personal computer in a local network, and any kind of processing control device which receives, processes and/or transmits stream data.

In the embodiments of the present invention, the MC 201 receives the conference control command, and transmits a transfer rule to the MP 202. The MC 201 further receives respective bandwidths and needs of the terminal equipment (such as the terminal equipment C1, C4 and C5) in order to perform the allocation scheme of the bandwidth. More specifically, the MC 201 collects the real-time bandwidths and the conference requirements of all terminal equipment C1~C10. For example, the real-time bandwidth includes real-time uplink bandwidth and real-time downlink bandwidth. The conference requirement includes the highest coding capability (the highest video level), the discriminating rate of the camera, or the video application for other terminal equipment.

In the embodiments of the present invention, the bandwidth resource meets the application of the main video in first priority. The above allocation scheme of bandwidth includes the allocation scheme for the terminal equipment and the allocation scheme for the MP 202.

In the embodiments of the present invention, the allocation scheme for the terminal equipment provided by the MC 201 may include: whether transmitting audio or not, whether transmitting share and corresponding level or not, whether transmitting video or not, transmitting one video or two videos and the merging video level. More specifically, the uplink video scheme for the terminal equipment provided by the MC 201 includes: (a) not uploading the video; (b) only uploading one video (the main video Z, the supporting video F, or the share S); (c) uploading two videos (the main video Z plus the supporting video F, or the share S plus the supporting video F). The downlink video scheme for the terminal equipment provided by the MC 201 includes: (a) not transferring; (b) transferring the main video Z; (c) transferring the supporting video F; (d) transferring the share S; (e) transferring the share S and the supporting video F.

In the embodiments of the present invention, the allocation scheme for the MP 202 provided by the MC 201 can include: the transfer rule from one terminal equipment to another terminal equipment (for example, the transfer rule from the terminal equipment C1 to the terminal equipment C5), whether transferring audio or not, whether transferring the share or not, whether transferring video or transferring the level of the video.

In the embodiments of the present invention, according to different discriminating rate (resolution), the frame rate, the compression quality and the video code rate, the fixed occupying bandwidth of the transferring video can be divided into twenty levels, which are listed in the table (I) below.

TABLE (I)

| Level | Resolution | Frame Rate (F P S) | Compression Quality (Max QP[2-14]) | Video Code Rate (k bit/s) |
| --- | --- | --- | --- | --- |
| Level 0 | 160X90 | 4 | 14 | 30 |
| Level 1 | 160X90 | 8 | 12 | 44 |
| Level 2 | 160X90 | 15 | 10 | 58 |
| Level 3 | 192X108 | 8 | 12 | 70 |
| Level 4 | 192X108 | 15 | 12 | 80 |
| Level 5 | 256X144 | 8 | 12 | 90 |
| Level 6 | 256X144 | 12 | 12 | 100 |
| Level 7 | 256X144 | 15 | 10 | 115 |
| Level 8 | 320X180 | 8 | 12 | 125 |
| Level 9 | 320X180 | 12 | 10 | 140 |
| Level 10 | 320X180 | 15 | 8 | 170 |
| Level 11 | 480X270 | 8 | 12 | 200 |
| Level 12 | 480X270 | 15 | 10 | 250 |
| Level 13 | 640X360 | 10 | 10 | 320 |
| Level 14 | 640X360 | 15 | 8 | 420 |
| Level 15 | 720X405 | 15 | 8 | 500 |
| Level 16 | 1280X720 | 15 | 8 | 600 |
| Level 17 | 1280X720 | 30 | 8 | 690 |
| Level 18 | 1920X1080 | 15 | 8 | 810 |
| Level 19 | 1920X1080 | 30 | 8 | 980 |

In the embodiments of the present invention, the share occupying bandwidth of the transferring video can be divided into two levels according to different video code rates, which are shown in the table (II) below.

TABLE (II)

| Level | Video Code Rate (kbit/s) |
| --- | --- |
| 0 | 100 |
| 1 | 320 |

The present invention is not limited. People skilled in the art can adjust the level according to actual requirements without exceeding the scope of the present invention.

In the embodiments of the present invention, the MP 202 merely performs the frame buffer and the frame exchange. In other words, the MP 202 does not execute the coding and decoding for the audio stream and the video stream, but it executes the transferring and control for the data stream of the audio and the data stream of the video. More specifically, the MP 202 can find the buffer areas corresponding to the terminal equipment C1~C10 by utilizing the frame buffer mapping algorithm. Afterwards, the MP 202 stores the received data stream of the audio and the video to the buffer area. The MP 202 transfers the data stream of the video and the data stream of audio to specific terminal equipment based on the conference control command.

Therefore, in the embodiments of the present invention, the MP 202 of the MCU 200 transfers the processing operation of a large amount of data of coding and decoding of multiple audio and video to each of the terminal equipment C1~C10. Each of the terminal equipment C1~C10 performs coding and decoding on the corresponding audio and video. The MP 202 of the MCU 200 merely records and transfers the data streams of audio and the data streams of video of every audio. By utilizing the above equipment and arrangement, the loading of the MCU 200 can be reduced, and the overall efficiency of the video conference system 2 can be improved.

In the embodiments of the present invention, each of the terminal equipment C1~C10 regularly monitors the usage rate of its own central processing unit (CPU), the data loss of real-time transport protocol (RTP), and the RTP delay time (such as greater than 2000 ms) in order to evaluate the real-time bandwidth. Each of the terminal equipment C1~C10 further informs the bandwidth change of the MC 201 itself, so that the MC 201 can re-allocate the bandwidth scheme.

In the embodiments of the present invention, before the video conference starts, the attending terminal equipment (such as the terminal equipment C1, C4 and C5) tests the uplink and downlink bandwidths to the MP 202. After entering the video conference, the attending terminal equipment (such as the terminal equipment C1, C4 and C5) submits the tested bandwidths and the video (share) requirement for viewing the video (share) requirements of other terminal equipment, and assigns priorities for the video requirements. When the requirements of the above attending terminal equipment change (for example, the video for viewing and the share priority), the MC 201 will re-allocate the bandwidth scheme based on them.

In the embodiments of the present invention, each of the terminal equipment C1~C10 independently performs the statistics of the uplink and downlink RTP control protocol (RTCP) with the MP 202 of the server 20. The statistic content includes calculating the data loss and delay, and the statistical duration is not greater than 2 seconds. Finally, each of the terminal equipment C1~C10 evaluates the real-time network according to the above RTCP statistic.

In the embodiments of the present invention, when the above terminal equipment evaluates that the network becomes worse, the terminal equipment stops the video and the transmission of the share RTP data immediately, and informs new evaluation of the bandwidth to the MC 201. Accordingly, the MC 201 can re-assign the scheme. When the terminal equipment evaluates that the network is normal, the above terminal equipment will not adjust the evaluating bandwidth. When the terminal equipment evaluates that the network becomes better, the above terminal equipment slowly tries to increase the bandwidth. When there is RTCP data loss during the testing period, the delay will be increased, the testing will be abandoned, and the bandwidth remains. The terminal equipment evaluates a new bandwidth value for the MC 201 until the testing of 6 seconds finishes, so that the MC 201 can re-assign the scheme.

In the embodiments of the present invention, each of the terminal equipment C1~C10 can apply for viewing a main video Z at most, and it can apply for viewing a share S at most. In addition, each of the terminal equipment C1~C10 can apply for viewing a plurality of supporting video F. Furthermore, the resource of the bandwidth should meet the application of the main video Z at a higher priority.

In the embodiments of the present invention, the MC 201 executes the pre-processing for the bandwidth in order to restrict the difference between the uplink bandwidth and the downlink bandwidth to less than 5 times. For example, the uplink bandwidth value and the downlink bandwidth value provided by the terminal equipment C1 are 100 kb and 1000 kb respectively. After the processing of the MC 201, the uplink bandwidth value and the downlink bandwidth value of the terminal equipment C1 are 100 kb and 500 kb respectively.

Figure 3:
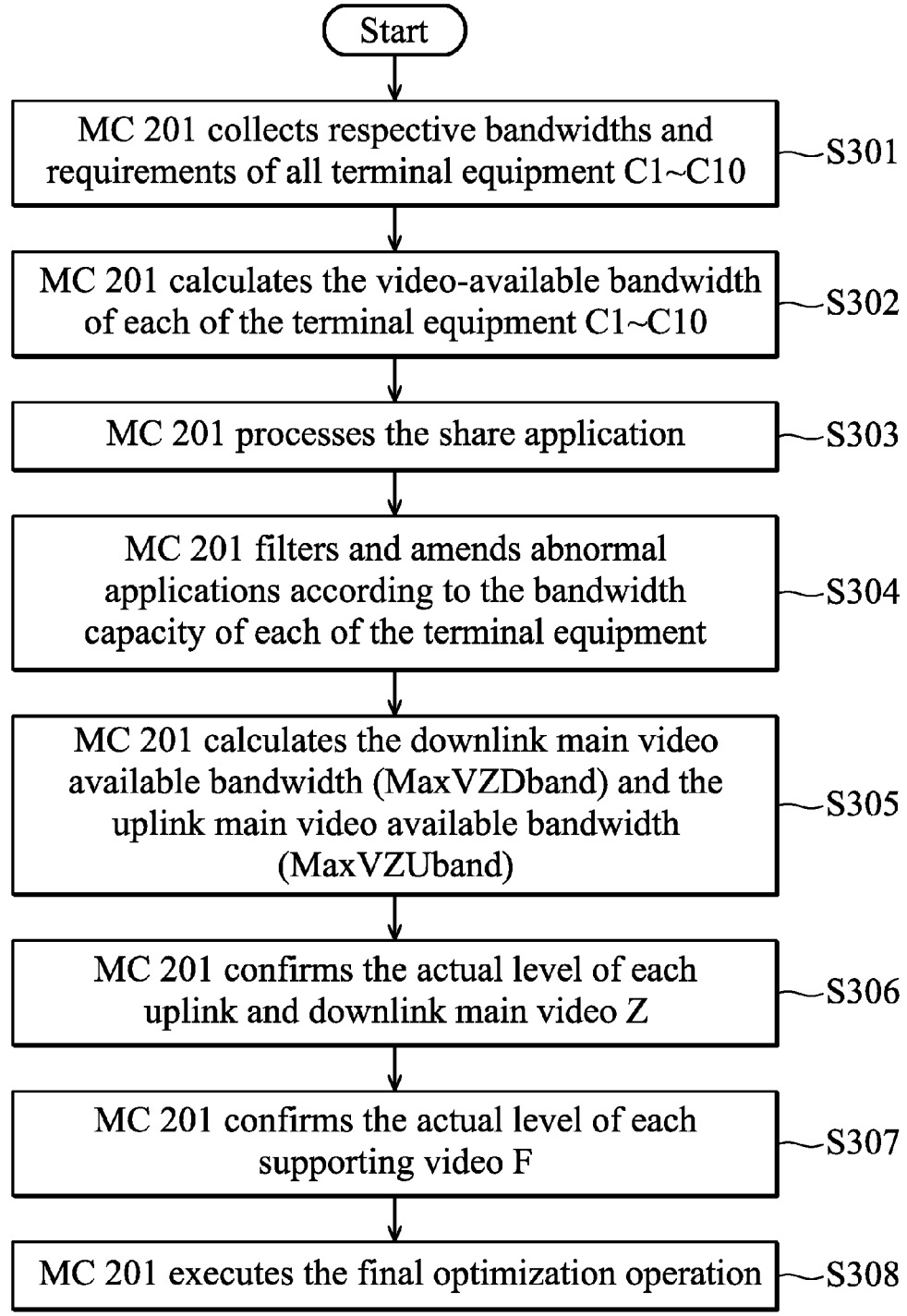
FIG. 3 is a flow chart illustrating the bandwidth allocation which is executed by the multipoint controller 201, in accordance with one embodiment of the present invention.

FIG. 3 is a flow chart illustrating the bandwidth allocation which is executed by the multipoint controller 201, in accordance with one embodiment of the present invention. In step S301, the MC 201 collects respective bandwidths and requirements of all terminal equipment C1~C10, such as the uplink bandwidth, the downlink bandwidth, the highest coding capability (the highest video level), the camera discriminating rate, or the video application form for other terminal equipment.

In step S302, the MC 201 calculates the video-available bandwidth of each of the terminal equipment C1~C10. In the embodiments of the present invention, it is necessary to reduce at least one audio bandwidth for the uplink. When the uplink bandwidth is less than 100 kb/s (the minimum audio requirement 60 kb/s for the forward error correction (FEC) plus a level 0 video 40 kb/s), the audio FEC of the terminal equipment is turned off.

In the embodiments of the present invention, at most three audio bandwidths are reduced (it is impossible to talk for more than three subjects) for the downlink. For example, regarding the audio conference, 60 kb/s is reserved for the fixed audio band (fixAudioBand) of one downlink, 80 kb/s is reserved for the fixed audio band (fixAudioBand) of two downlinks, 100 kb/s is reserved for the fixed audio band (fixAudioBand) of three downlinks, 60 kb/s is reserved for the fixed audio band (fixAudioBand) of the uplink. When the downlink bandwidth of any terminal equipment is less than 100 kb/s (the minimum audio requirement 60 kb/s for the FEC plus a level 0 video 40 kb/s), the audio FEC of the terminal equipment is turned off. The calculation of the value of the fixed audio band has no relation with whether the FEC is turned off or not. In addition, the fixed audio bandwidth of the downlink and uplink is 40 kb/s for a conference without audio.

In another embodiment of the present invention, when the downlink bandwidth of any terminal equipment is less than 100 kb/s of two subjects, 120 kb/s of three subjects or 140 kb/s of four subjects, all of the audio FEC of the terminal equipment will be turned off.

In the embodiments of the present invention, the MC 201 reserves 15% bandwidth for guaranteeing the audio except the occupation of the audio. Therefore, the maximum available bandwidth for the uplink video (MaxVUband) and the maximum available bandwidth for the downlink video (MaxVDband) can be illustrated respectively as:

$$MaxVUband = (UBand - fixAudioBand) * 85\%$$

$$MaxVDband = (DBand - fixAudioBand) * 85\%$$

The fixAudioBand refers to the fixed audio band, the UBand refers to the TPC bandwidth of the uplink test, and the DBand refers to the TPC bandwidth of the downlink test.

In step S303, the MC 201 processes the share application. In some embodiments of the present invention, the MC 201 receives the uplink available bandwidth of the share transmission subject and the downlink available bandwidth of the share receiving subject and calculates the share bandwidth (SharingBand) according to a share band bandwidth algorithm.

In some embodiments of the present invention, when the share bandwidth calculated by the MC 201 is greater than 0, it means transmitting share. In one embodiment, the share bandwidth is subtracted from the uplink video of share transmission subject (MaxVUband-sharingBand). In one embodiment, when the downlink available video bandwidth of the share receiving subject is equal to or greater than the share bandwidth, the terminal equipment (i.e., the share receiving subject) can receive the share. At the same time, the share bandwidth is subtracted from the downlink video available bandwidth (MaxVDband-sharingBand). In one embodiment, when the downlink available video bandwidth of the share receiving subject is less than the share bandwidth, the terminal equipment (i.e., the share receiving subject) does not receive the share, and the downlink video available bandwidth (MaxVDband) remains the same.

In the embodiments of the present invention, the discriminating rate of the share coding is identical to the discriminating rate of the share resource. The share coding bandwidth is confirmed to be the share band (SharingBand) by adjusting the coding frame rate and the coding quality.

The share bandwidth algorithm is illustrated by one embodiment of the present invention. In the embodiment, it is supposed that N terminal equipment (C1~Cn) receive the share of the same terminal equipment C0, and the MC 201 confirms the bandwidth of the share transmission through the above share bandwidth algorithm. The available uplink share bandwidth of the transmission subject (the terminal equipment C0) is SendBand, and the available downlink share bandwidth of the receiving subjects (the terminal equipment C1~Cn) is RecvBands. The share bandwidth value which is output by the MC 201 is sharingBand. When the sharingBand is 0, the MC 201 does not transmit the share.

In the embodiment, when the SendBand is less than 100 kb/s, the sharingBand is 0. When the SendBand is greater than or equal to 100 kb/s, the MC 201 divides all receiving subjects into three groups g1, g2 and g3 according to respective downlink share bandwidths of all receiving subjects (terminal equipment C1~Cn). For example, the three divided groups are [0,100), [100,320) and [320,∞).

In the embodiment, when the g2 is not an empty set, the sharingBand is 100 kb/s. When the g3 is not an empty set and SendBand is less than 320 kb/s, the sharingBand is 100 kb/s. When the g3 is not an empty set and SendBand is greater than or equal to 320 kb/s, the sharingBand is 320 kb/s. When the g2 and g3 are empty sets, the sharingBand would be 0.

In step S304, the MC 201 filters and amends abnormal applications according to the bandwidth capacity of each of the terminal equipment C1~C10. In the embodiments of the present invention, when MaxVUband of one terminal equipment (such as the terminal equipment C1) is less than Level 0, the uplink of the terminal equipment (the terminal equipment C1) is set to be Level 0 if the share is not transmitted. Otherwise, the uplink scheme of the terminal equipment (the terminal equipment C1) is confirmed to be no transmission.

In another embodiment of the present invention, if there is no terminal equipment which needs to watch the terminal equipment C1, the uplink scheme of the terminal equipment C1 is confirmed to be no transmission. In another embodiment of the present invention, if the main video and the supporting video are both applied for the terminal equipment C1 but the MaxVUband of the terminal equipment C1 is less than Level 8+Level 0, the application of the main video is changed to the application of the supporting video.

In another embodiment of the present invention, when the terminal equipment C1 applies a main video and K supporting video but the MaxVDband of the terminal equipment C1 is less than Level 8+K*Level 0, the application of the main video is changed to the application of the supporting video.

In another embodiment of the present invention, when the terminal equipment C1 needs to transmit share, MC 201 degrades all applications for the main video of the terminal equipment C1 to the applications for the supporting video of the terminal equipment C1 (avoiding three codings of the terminal equipment C1 and reducing the bandwidth and CPU in an embedded occupation).

In step S305, the MC 201 calculates the downlink main video Z available bandwidth (MaxVZDband) and the uplink main video Z available bandwidth (MaxVZUband). In one embodiment of the present invention, if only the main video Z is applied for the terminal equipment (such as the terminal equipment C1), then MaxVZUband is equal to MaxVUband.

In another embodiment of the present invention, for example, the bandwidth occupation rate of the main video Z is 80% (ZUband %=80%), and the bandwidth occupation rate of the supporting video F is 20% (FUband %=1−Zuband %=20%).

In another embodiment of the present invention, when the main video Z and the supporting video F are both applied for the terminal equipment (such as the terminal equipment C1), the available bandwidth of the uplink main video Z is MaxVZUband=MaxUband*ZUband %.

In another embodiment of the present invention, when the main video Z and the supporting video F are both applied for the downlink of the terminal equipment (such as the terminal equipment C1) and the video number of the application for the supporting video F is ReqF, the available bandwidth of the downlink main video Z is MaxVZDband=MaxVDband*(ZUband %/FUband %)/(ReqF+(ZUband %/FUband %)).

In step S306, the MC 201 confirms the actual level of each uplink and downlink main video Z. In one embodiment of the present invention, the MC 201 calculates the Level corresponding to the uplink and downlink main video Z based on the "main video algorithm" by utilizing the Level of the maximum uplink main video Z (based on MaxVZUband) and the requirements of the maximum Level for other main video Z (such as downlink). In another embodiment of the present invention, the MC 201 further calculates the remaining uplink bandwidth and the remaining downlink bandwidth (subtracting the real bandwidth of the main video Z) of each terminal equipment.

The main video algorithm is illustrated by one embodiment of the present invention. In the embodiment, it is supposed that nine terminal equipment (C1~C9) apply to receive the main video of the same terminal equipment C0, and the MC 201 confirms the actual level (Level) of the main video which is transmitted by the terminal equipment C0 through the above main video algorithm. The main video algorithm can evaluate the capability of all receiving terminal equipment in order to clarify the terminal equipment which receive the main video and the terminal equipment which receive the supporting video.

In the embodiment, the uplink limit level of the main video (Level) of the terminal equipment C0 is defined as L-C0, and it is the downlink limit level (Level) for all terminal equipment which apply the main video. Finally, the obtained actual level (Level) of the main video is L.

The steps for executing the above main video algorithm are illustrated below. First of all, the satisfaction deduction table is illustrated as table (III).

TABLE III

| Level | 1 | 2 | 3 | 4 | 5 | 6 | 7 | 8 | 9-19 |
|---|---|---|---|---|---|---|---|---|---|
| Decrement Deduction (point) | 5 | 10 | 20 | 40 | 50 | 60 | 80 | 90 | 100 |

In the embodiment, the initial satisfaction degree of each of the terminal equipment (C1~C9) is 100 points. Afterwards, the rule for calculating the satisfaction degree of the terminal equipment is illustrated below. For example, the limit Level of the terminal equipment C1 is Level 12. When the main video is level 12, the terminal equipment C1 can obtain the video of Level 12, and the satisfaction degree is 100 points. When the main video is level 11, the terminal equipment C1 can obtain the video of Level 11, and the satisfaction degree is 95 points which is equal to subtracting 5 points from 100 points. When the main video is level 13, the terminal equipment C1 can only obtain the supporting video. When the input of the supporting video is level 0, the satisfaction degree is 0 points which is equal to subtracting 100 points from 100 points.

Afterwards, the MC 201 sorts every terminal equipment (C1~C9) from a low level to a high level according to its individual limit Level (which is recorded as L-C1, L-C2, L-C3, . . . , L-C9). Afterwards, the MC 201 assigns L to be L-C1, L-C2, L-C3, L-C9 in sequence, and L is smaller than or equal to L-C0. Therefore, the satisfaction for each of the terminal equipment is calculated by the MC 201. Afterwards, the MC 201 finds the terminal equipment with highest satisfaction degree among all the obtained L values (if several satisfaction degrees of L are the same, the highest L will be derived). L will be determined to be the actual level (Level) of the main video.

In step S307, the MC 201 confirms the actual level (Level) of each supporting video F. In one embodiment of the present invention, the MC 201 sorts all of the sets which request the F video, and sorts back the set which applies the Z video and is degraded for applying the F video, and sequentially calculates the level of the F video of each set.

In another embodiment of the present invention, if the uplink of a terminal equipment (such as the terminal equipment C1) is determined to transmit the main video of Level Z, the uplink F video of the terminal equipment cannot exceed (and be equal) to Level (Z-4).

In another embodiment of the present invention, supposing there are N terminal equipment which need to receive the F video of the terminal equipment C1, whether or not the uplink and downlink of every terminal equipment reaches to the limit is determined by increasing the level from Level 0. When the uplink (or downlink) reaches the limit, the Level of the uplink (or downlink) of the terminal equipment can be determined.

In another embodiment of the present invention, when a terminal equipment (such as the terminal equipment C5) needs to transmit the supporting video which is labeled MinVFDlevel=MIN (the limit level of the customer subjects which need to receive the supporting video of the terminal equipment C1), it can be determined that the uplink bandwidth Level of the supporting video of the terminal equipment C1 is MIN(MaxVFUlevel, MinVFDlevel). The MaxVFUlevel is the highest Level which can be obtained by subtracting the occupied bandwidths of all audio, the main video Z or the share S from the bandwidth of the terminal equipment C1.

In another embodiment of the present invention, when a terminal equipment (such as the terminal equipment C4) is determined to transmit the supporting video but does not transmit the main video, and the uplink bandwidth and the coding limit can afford to transmit Level Z=MIN (Level F+4, Level 8), it is further calculated to determine whether transmitting the Z video or not. In one embodiment, the respective downlink limit Level of each terminal equipment which requests the Z video of the terminal equipment C1 is less than Level Z, and it can be determined that the terminal equipment C1 does not need to transmit the Z video. In one embodiment, the terminal equipment with a downlink limit that is greater than Level Z is found among all terminal equipment of the Z video of the terminal equipment C1, and the downlink limit is labeled as Level X and Level X>=MIN (Level F+4, Level 8). The MC 201 confirms that the main video of the terminal equipment C1 is Level F_Z=MIN (Level X, the uplink limit of L video of the terminal equipment C1, the coding limit of the terminal equipment C1), and the downlink transfers the Z video to the terminal equipment (which has a downlink limit greater than Level Z).

In step S308, the MC 201 executes the final optimization operation. Respective downlink and uplink schemes for all terminal equipment have been determined. Finally, the MC 201 finds the terminal equipment with the remaining downlink bandwidth, and checks whether some receiving video can be increased or not. If it can be increased, the MC 201 checks and increases sequentially according to the priority submitted and applied by each terminal equipment.

Figure 4A:
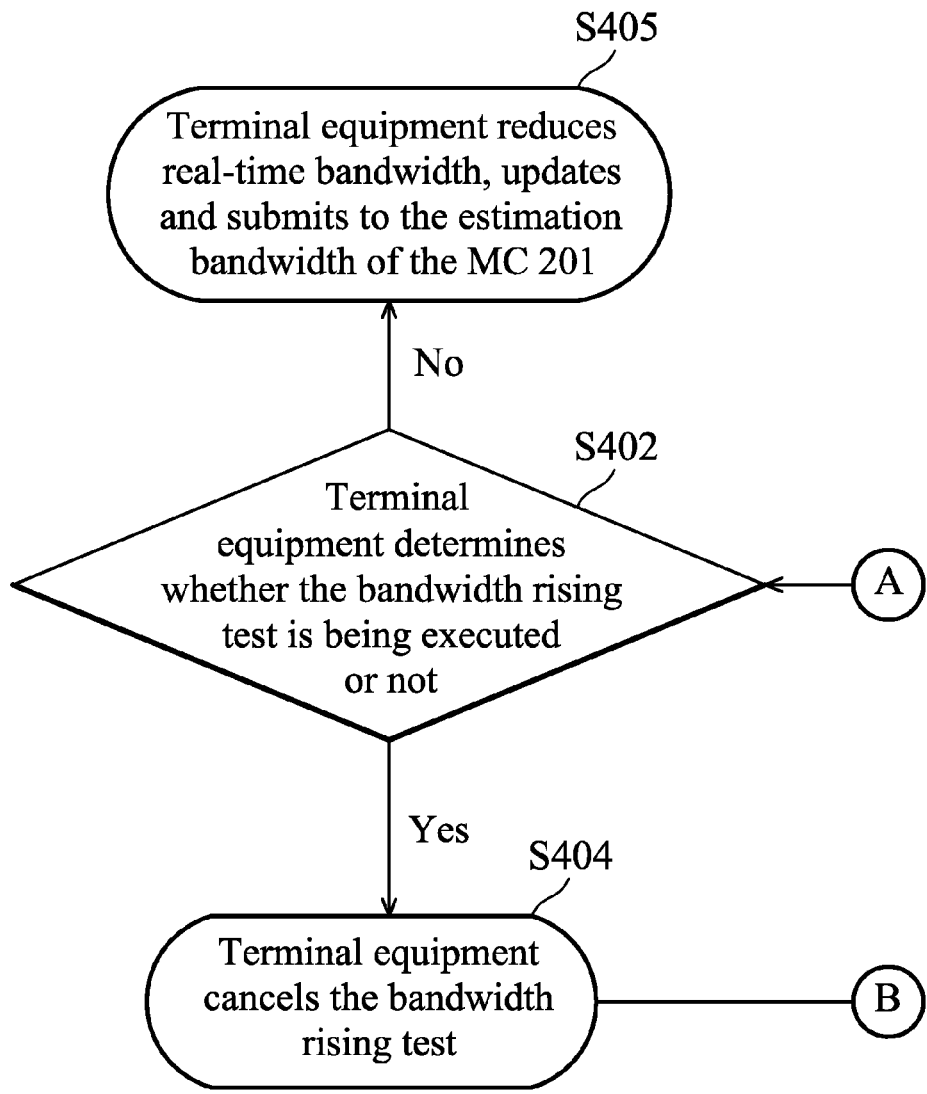
FIG. 4A-4C collectively comprise a flow chart illustrating the real-time estimation method which is applied on the terminal equipment, in accordance with one embodiment of the present invention.
Figure 4B:
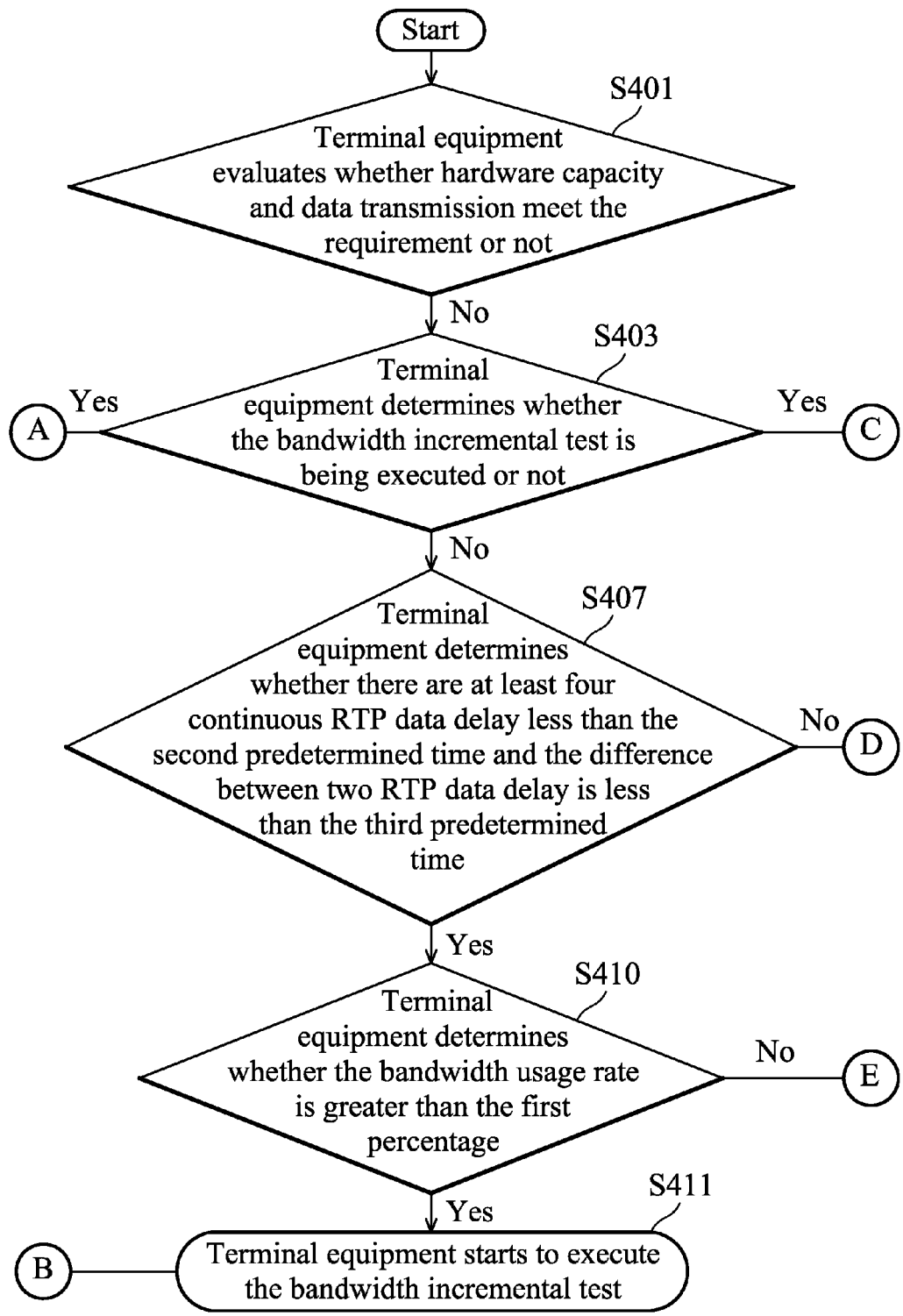
Figure 4C:
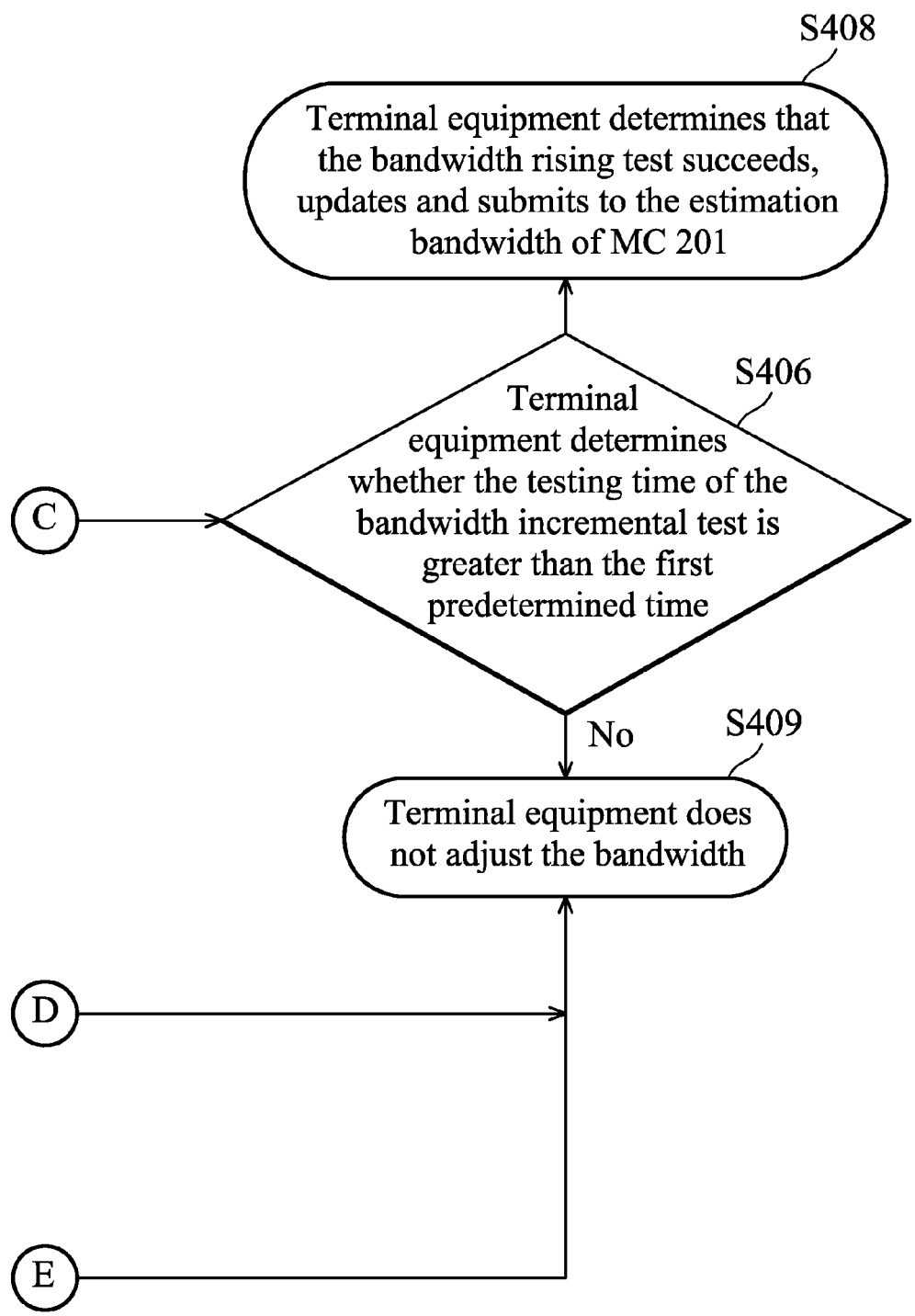

FIGS. 4A-4C collectively comprise a flow chart illustrating the real-time estimation method which is applied on the terminal equipment (such as the terminal equipment C1), in accordance with one embodiment of the present invention. In step S401, terminal equipment evaluates whether the hardware capacity and data transmission meet the requirements or not. In one embodiment, the hardware capacity includes the CPU usage rate. For example, the terminal equipment evaluates whether the CPU usage rate is greater than a first percentage (such as 85%). In one embodiment, the data transmission includes the status of RTP data transmission. For example, the terminal equipment monitors whether the RTP data is lost. For example, the terminal equipment monitors whether the delay time of the RTP data is greater than 2000 ms or not. For example, the terminal equipment detects whether the current delay time of the RTP data is greater than the previous delay time of the RTP data by 500 ms. If the terminal equipment evaluates that the hardware capacity and the data transmission meet the requirements, step S402 will be executed. If the terminal equipment evaluates that either the hardware capacity or the data transmission does not meet the requirements (for example, the CPU usage rate is greater than 85%, the RTP data is lost, the delay time of RTP data is greater than 2000 ms, or the current delay time of the RTP data is greater than the previous delay time of the RTP data by 500 ms.), step S403 will be executed.

In step S402, the terminal equipment determines whether the bandwidth rising test is being executed or not. If yes, step S404 will be executed; if not, step S405 will be executed. In step S404, the terminal equipment cancels the bandwidth rising test. In step S405, the terminal equipment reduces real-time bandwidth, updates and submits to the estimation bandwidth of the MC 201.

In step S403, the terminal equipment determines whether the bandwidth incremental test is being executed or not. If yes, step S406 will be executed; if not, step S407 will be executed. In step S406, the terminal equipment determines whether the testing time of the bandwidth incremental test is greater than the first predetermined time, such as 6 seconds. If yes, step S408 will be executed; if not, step S409 will be executed. In step S408, the terminal equipment determines that the bandwidth rising test succeeds, updates and submits to the estimation bandwidth of MC 201. In step S409, the terminal equipment does not adjust the bandwidth.

In step S407, the terminal equipment determines whether there are at least four continuous RTP data delays that are less than the second predetermined time (such as 500 ms) and the difference between two RTP data delays is less than the third predetermined time (such as 100 ms). If yes, step S410 will be executed; if not, step S409 will be executed.

In step S410, the terminal equipment determines whether the bandwidth usage rate is greater than the first percentage (such as 60%). If yes, step S411 will be executed; if not, step S409 will be executed. In step S411, the terminal equipment starts to execute the bandwidth incremental test.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the present disclosure has been described by way of example and in terms of preferred embodiment, it is to be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A video conference system, comprising:
a plurality of terminal equipment, wherein each of the terminal equipment evaluates a real-time bandwidth and transmits the real-time bandwidth and a conference requirement; and
a server, connected to each of the terminal equipment wirelessly or with wires in order to receive the real-time bandwidth and the conference requirement corresponding to each of the terminal equipment, wherein a multipoint control unit of the server comprises:
a multipoint controller, receiving a conference control command to execute a multi-subject video conference, wherein the multipoint controller determines a transfer rule and an allocation scheme corresponding to each of the terminal equipment based on the real-time bandwidth and the conference requirement corresponding to each of the terminal equipment; and
a multipoint processor, connected to the multipoint controller, receiving the transfer rule and an audio data stream or a video data stream from each of the terminal equipment, wherein the multipoint processor transfers the audio data stream or the video data stream which is needed by each of the terminal equipment based on the transfer rule;

wherein the server transmits each of the allocation scheme to the corresponding terminal equipment; and wherein when any one of the terminal equipment transmits a new real-time bandwidth or a new conference requirement, the multipoint controller re-determines the transfer rule and the allocation rule.

2. The video conference system as claimed in claim 1, wherein the multipoint controller determines the transfer rule and the allocation scheme further comprising calculating a video available bandwidth of each of the terminal equipment.

3. The video conference system as claimed in claim 1, wherein the multipoint controller determines the transfer rule and the allocation scheme further comprising:
when one of the terminal equipment is a share transmitting subject, the multipoint controller further receives an uplink available bandwidth of the share transmitting subject and a downlink share available bandwidth table of the share receiving subject, and calculates a share bandwidth accordingly.

4. The video conference system as claimed in claim 1, wherein the multipoint controller determines the transfer rule and the allocation scheme further comprising filtering or amending an abnormal application based on the real-time bandwidth of each of the terminal equipment.

5. The video conference system as claimed in claim 1, wherein the multipoint controller determines the transfer rule and the allocation scheme further comprising:
calculating a downlink main video available bandwidth and an uplink main video available bandwidth;
determining a video occupation bandwidth of uplink and downlink main video corresponding to each of the terminal equipment; and
determining a video occupation bandwidth of each supporting video.

6. The video conference system as claimed in claim 1, wherein the server is a cloud server, and the multipoint processor is a software module.

7. The video conference system as claimed in claim 1, wherein the conference requirement comprises highest coding capability and a camera discriminative rate corresponding to the terminal equipment, or a video application of the terminal equipment for other terminal equipment.

8. A server, executing a multi-subject video conference, comprising:
a multipoint control unit, connected to a plurality of terminal equipment wirelessly or with wires in order to receive a real-time bandwidth and a conference requirement corresponding to each of the terminal equipment, wherein the multipoint control unit of the server comprises:
a multipoint controller, receiving a conference control command to execute a multi-subject video conference, wherein the multipoint controller determines a transfer rule and an allocation scheme corresponding to each of the terminal equipment based on the real-time bandwidth and the conference requirement corresponding to each of the terminal equipment; and
a multipoint processor, connected to the multipoint controller, receiving the transfer rule and an audio data stream or a video data stream from each of the terminal equipment, wherein the multipoint processor transfers the audio data stream or the video data stream which is needed by each of the terminal equipment based on the transfer rule;

wherein the server transmits each of the allocation scheme to the corresponding terminal equipment; and wherein when any one of the terminal equipment transmits a new real-time bandwidth or a new conference requirement, the multipoint controller re-determines the transfer rule and the allocation rule.

9. The server as claimed in claim 8, wherein the multipoint controller determines the transfer rule and the allocation scheme further comprising calculating a video available bandwidth of each of the terminal equipment.

10. The server as claimed in claim 8, wherein the multipoint controller determines the transfer rule and the allocation scheme further comprising:
when one of the terminal equipment is a share transmitting subject, the multipoint controller further receives an uplink available bandwidth of the share transmitting subject and a downlink share available bandwidth table of the share receiving subject, and calculates a share bandwidth accordingly.

11. The server as claimed in claim 8, wherein the multipoint controller determines the transfer rule and the allocation scheme further comprising filtering or amending an abnormal application based on the real-time bandwidth of each of the terminal equipment.

12. The server as claimed in claim 8, wherein the multipoint controller determines the transfer rule and the allocation scheme further comprising:
calculating a downlink main video available bandwidth and an uplink main video available bandwidth;
determining a video occupation bandwidth of uplink and downlink main video corresponding to each of the terminal equipment; and
determining a video occupation bandwidth of each supporting video.

13. The server as claimed in claim 8, wherein the server is a cloud server, and the multipoint processor is a software module.

14. The server as claimed in claim 8, wherein the conference requirement comprises the highest coding capability and a camera discriminative rate corresponding to the terminal equipment, or a video application of the terminal equipment for other terminal equipment.

* * * * *